United States Patent [19]

Blair et al.

[11] Patent Number: 6,141,125
[45] Date of Patent: Oct. 31, 2000

[54] INTRA-NODE DIAGNOSTIC SIGNAL

[75] Inventors: Loudon T. Blair, Annapolis, Md.;
Steven W. Cornelius, Lilburn, Ga.;
Steffen Koehler, Annapolis, Md.;
Kevin Meagher, Bowie, Md.; Victor Mizrahi, Columbia, Md.

[73] Assignee: CIENA Corporation, Linthicum, Md.

[21] Appl. No.: 09/012,991

[22] Filed: Jan. 26, 1998

[51] Int. Cl.[7] .................................................. H04B 10/08
[52] U.S. Cl. ......................... 359/110; 359/124; 359/119; 359/152; 385/24
[58] Field of Search .................................. 359/110, 124, 359/119, 152; 385/24

[56] References Cited

U.S. PATENT DOCUMENTS

| | | | |
|---|---|---|---|
| 5,654,816 | 8/1997 | Fishman | 359/177 |
| 5,757,526 | 5/1998 | Shiragaki et al. | 359/110 |
| 5,867,289 | 2/1999 | Gerstel et al. | 359/110 |

*Primary Examiner*—Leslie Pascal
*Assistant Examiner*—Hanh Phan
*Attorney, Agent, or Firm*—Daniel N. Daisak; David L. Soltz

[57] ABSTRACT

A method for monitoring a plurality of components associated with a communications network node. A diagnostic service signal is generated at an intra-node component and transmitted along a first optical path to another intra-node component where the presence or absence of the signal is detected. In this manner, optical paths defined between intra-nodal components can be monitored using a diagnostic service signal.

35 Claims, 11 Drawing Sheets

INTRA-NODE DIAGNOSTIC SIGNAL

FIELD OF INVENTION

The present invention relates generally to optical communication systems and more particularly to an apparatus and method for monitoring components within an optical communications network.

BACKGROUND

Wavelength Division Multiplexing (WDM) optical networks have traditionally been used for long haul point-to-point transmission. However, with the increasing demands on communication systems, WDM optical networks can also be used in smaller system configurations, such as local telephone or data networks, e.g. LANS, MANS, etc. Communication signals are transmitted over a limited geographic area to various nodes within a network.

These types of communication networks typically include a plurality of nodes. Each node can include one or more optical add/drop multiplexers configured to select a corresponding one or more information-bearing or payload channels from a received WDM signal. An example of an add/drop multiplexer used in this type of network is described in co-pending U.S. patent application entitled "Optical Add/Drop Multiplexer" filed on Oct. 23, 1997 having unofficial Ser. No. 08/956,807 and assigned to the assignee of the present invention (hereinafter referred to as "copending Optical Add/Drop Multiplexer Application"). The information contained in the dropped or selected channels is processed and the channels carrying new information are added to the WDM signal for transmission to other nodes in the network. A service channel, usually outside the information bearing or payload channel bandwidth, is included in this type of network for carrying system housekeeping information, for example network monitoring and control signals as well as telemetry information, to and/or from nodes in the network.

Network nodes may include multiple Optical Add/Drop Multiplexers (OADMs) or other devices to drop different payload channels. When multiple OADMs, for example, are present within the same node, the service channel is dropped at the first OADM within the node and is added again at the last OADM before exiting the node. If a fault occurs between the intra-node OADMs, the service channel is incapable of detecting this fault because the service channel signal does not traverse each intra-node optical path. In some circumstances, the service channel doesn't traverse each OADM, nor does it traverse transceivers associated with each OADM.

Accordingly, there is a need for a method and apparatus for providing a service channel to monitor/control intra-node optical paths within a communications network.

SUMMARY OF INVENTION

The present invention meets the above-referenced needs by providing a method for monitoring a plurality of optical paths associated with a communications network node. A diagnostic service signal is generated at a first nodal component and transmitted along a first optical path to a second nodal component. The presence or absence of this service channel signal is detected at the second nodal component. Alternatively, a low frequency tone can be modulated on the diagnostic service signal in order to associate a particular tone with a payload channel transmitter.

In an alternative embodiment, a service channel monitoring apparatus is used within a communications network node to monitor optical paths between intra node components. An optical path is disposed between a first and second nodal component and carries a diagnostic service signal transmitted from the first nodal component to the second nodal component. A receiving element is coupled to the optical path and detects the presence or absence of the signal at the second nodal component. In this manner, optical paths defined between intra-nodal components can be monitored using a diagnostic service signal.

DETAILED DESCRIPTION

Figure 1:
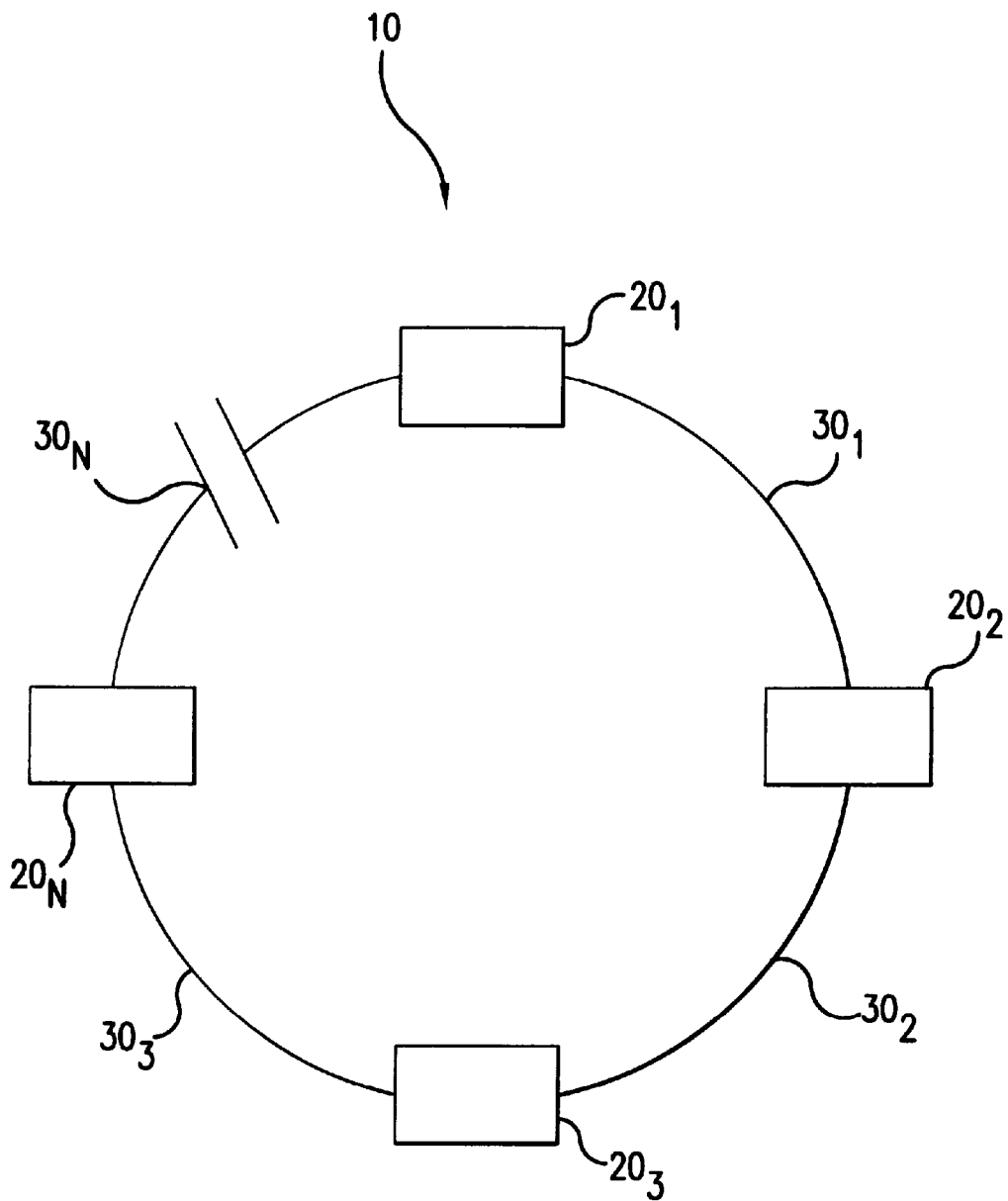
FIG. 1 illustrates a schematic diagram of an exemplary optical network in accordance with the present invention.

Turning to the drawings in which like reference characters indicate the same or similar elements, FIG. 1 schematically illustrates an optical network 10 having a plurality of nodes $20_1, 20_2, 20_3 \ldots 20_N$ and corresponding optical paths $30_1, 30_2, 30_3 \ldots 30_N$ therebetween where N corresponds to the number of network nodes. Each node $20_1, 20_2, 20_3 \ldots 20_N$ may, for example, represent separate geographical locations within network 10. The optical paths $30_1, 30_2, 30_3 \ldots 30_N$ carry a wavelength division multiplexed (WDM) communication signal including a plurality of payload channels having wavelengths $\lambda_1 \ldots \lambda_i$ between nodes $20_1, 20_2, 20_3 \ldots 20_N$. A service channel having wavelength $\lambda_{SC}$ different than the payload channel wavelengths, can also be carried between nodes $20_1, 20_2, 20_3 \ldots 20_N$ in network 10. The optical paths $30_1, 30_2, 30_3 \ldots 30_N$ can be a pair of optical fibers; a first fiber being configured to carry signals between nodes $20_1, 20_2, 20_3 \ldots 20_N$ in a clockwise direction and a second fiber configured to carry signals between nodes $20_1, 20_2, 20_3 \ldots 20_N$ in a counter clockwise direction. The optical paths $30_1, 30_2, 30_3 \ldots 30_N$ can also be configured as bidirectional where the WDM signal is carried in both clockwise and counterclockwise directions. Each node $20_1$, $20_2$, $20_3$ ... $20_N$ may be configured to receive one or more payload channels. A node may also receive a service channel carrying housekeeping information. A node may be configured to select a particular payload channel as well as a service channel. An example of a type of device that may be used for this purpose is an optical add/drop multiplexer (OADM) such as the one described in co-pending Optical Add/Drop Multiplexer Application. It should be understood that alternative devices may also be employed.

The remaining optical channels continue propagating to other nodes within network 10. The optical paths $30_1$, $30_2$, $30_3$ ... $30_N$ can support different transmission protocols and data rates such as OC3, OC12, OC48, 100BT Ethernet, Gigabit Ethernet or Native ATM, STM-1, STM-4, STM-16 ... STM-N. As described in copending U.S. patent application entitled "WDM Ring System Having An Optical Service Channel" assigned to the assignee of the present invention and incorporated herein by reference, network 10 can have a ring configuration, but the network in accordance with the present invention can also accommodate other network architectures.

Figure 2:
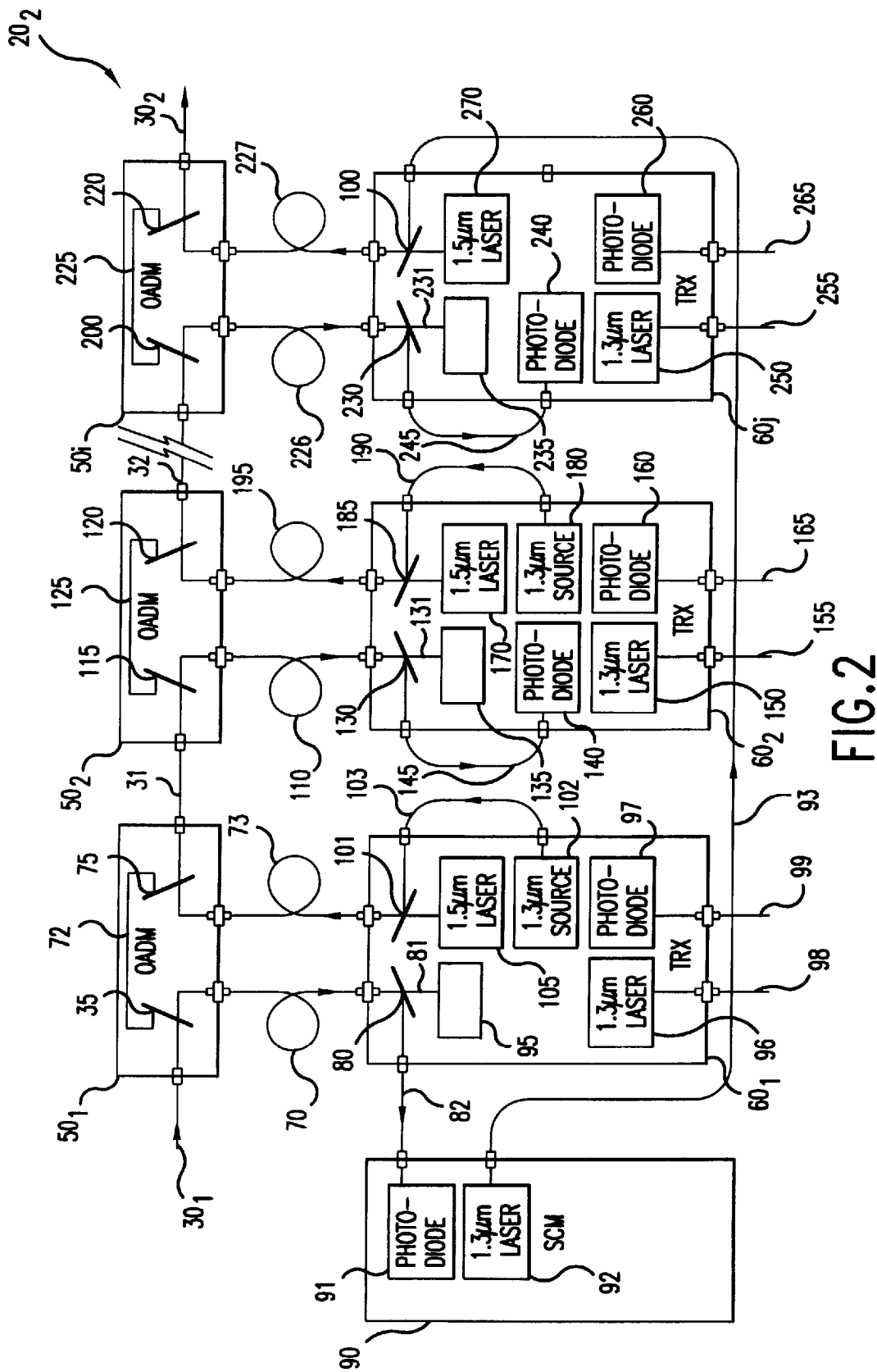
FIG. 2 illustrates a schematic block diagram of a network node including the use of a diagnostic service signal in accordance with the present invention.

FIG. 2 is a schematic block diagram of an exemplary node $20_2$. For purposes of ease of explanation, node $20_2$ is described as having OADMs $50_1$, $50_2$ ... $50_i$ as disclosed in co-pending Optical Add/Drop Multiplexer Application. However, other OADM designs as well as other devices and configurations can also be used to select a payload channel and a service channel without departing from the scope of the invention. The signal path direction around network 10, i.e. clockwise or counter clockwise, will determine which of the OADMs is considered the first OADM and which is considered the last OADM within a particular node. For example, OADM $50_1$, may be considered the first OADM within node $20_2$ and OADM $50_i$ may be considered the last OADM within node $20_2$. It should be understood that additional OADMs can be disposed between OADM $50_2$ and OADM $50_i$ depending on the size and configuration of network node $20_2$.

The first OADM $50_1$, in node $20_2$ receives a WDM signal via optical path $30_1$. OADM $50_1$ selects a payload channel having a particular wavelength, for example $\lambda_2$, and a service channel having wavelength $\lambda_{SC}$. The payload channel is supplied to terminal equipment where the information carried on the payload channel is processed; the channel is added back to the WDM signal and supplied to the next OADM $50_2$ by way of optical path 31. Likewise, OADM $50_2$ drops/adds a particular channel from the WDM signal and supplies the WIDM signal to the next OADM $50_i$ by way of optical path 32. OADM $50_i$ drops one or more WDM channels and adds a service channel wavelength $\lambda_{SC}$ and supplies these signals to the next node in the network via optical path $30_2$. OADMs $50_1$, $50_2$ ... $50_i$ may be separated by distances, for example, ranging from 1 meter or less to 15 km or more. Therefore, a service channel should be supplied to each OADM within node $20_2$ in order to monitor/control the condition of the OADMs, their associated transceivers, and to monitor the continuity of paths 31, 32, 73, 110, 195 and 226 as well as paths between additional OADMs and transceivers.

As described in the co-pending Optical Add/Drop Multiplexer Application, each OADM $50_1$, $50_2$ ... $50_i$ includes a filtering element 35, for example an interference filter, which drops a payload channel associated with a particular wavelength, as well as a service channel, from the WDM signal. The payload channel can be, for example, in the range of 1.5 $\mu$m and the service channel can be, for example in the range of 1.3 $\mu$m. Each OADM $50_{1, 502}$ ... $50_i$ has a corresponding transceiver $60_1$, $60_2$ ... $60_j$, respectively, which receives the dropped payload channel. OADMs $50_1$, $50_2$ ... $50_i$ may be in close proximity to their respective transceivers $60_1$, $60_2$ ... $60_j$ or they may be separated by a distance, for example, from less than 1 m to 1 km or more.

By way of example, OADM $50_1$ drops a payload channel having a particular wavelength, e.g. $\lambda_2$, in the 1.5 $\mu$m range, as well as the service channel, for example having wavelength $\lambda_{SC}$ in the 1.3 $\mu$m range, and supplies these channels to transceiver $60_1$ via line 70. The remaining channels present in the WDM signal having wavelengths $\lambda_1$, $\lambda_3$ ... $\lambda_i$ received via optical path $30_1$, are passed through to optical combining element 75 via line 72.

Transceiver $60_1$ associated with OADM $50_1$ includes an optical separator 80 which separates the payload channel having wavelength $\lambda_2$ from the service channel having wavelength $\lambda_{SC}$. Once separated, the payload channel is supplied to a receiving element (RE) 95 via line 81 and the service channel is supplied to a service channel modem 90 via line 82. The receiving element 95, such as a photodiode, receives the payload channel having wavelength $\lambda_2$ and generates electrical signals in response thereto. These signals are used to modulate, either directly or externally, a second light source 96 included in transceiver $60_1$ which is coupled to line 98. In this manner, light source 96 is used to transmit the information received via the payload channel having wavelength $\lambda_2$, to a channel having a different wavelength, usually in the 1.3 $\mu$m range, so that it can be recognized by customer receiving equipment (e.g. SONET equipment) coupled to transceiver $60_1$, via line 98.

Transceiver $60_1$ includes a receiving element 97, such as a photodiode, which receives information signals from customer transmission equipment at a particular wavelength via line 99, usually in the 1.3 $\mu$m range, and generates electrical signals in response thereto. These signals are used to modulate, either directly or externally, light source 105 which transmits the optical channel having wavelength $\lambda_2$ in the 1.5 $\mu$m range to OADM $50_1$ by way of combining element 101 and line 73. This optical channel having wavelength $\lambda_2$, is added to the WDM pass-through channels, carried on line 72, by way of combining element 75 and supplied to OADM $50_2$ via line 31.

The service channel having wavelength $\lambda_{SC}$, after being separated from the payload channel by optical separator 80, is supplied to a service channel modem 90 which includes a photodetector 91, such as a photodiode, and a 1.3 $\mu$m light source 92 such as a laser. Optical separator 80 can be, for example, an interference filter, optical coupler, etc. Photodetector 91 receives the service channel and generates electrical signals in response thereto. Light source 92 produces a service channel signal having wavelength $\lambda_{SC}$ and supplies it, via line 93, to combining element 100 of transceiver $60_j$ associated with the last OADM $50_i$ in node $20_2$. The service channel signal supplied by light source 92 carries system housekeeping information, for example network monitoring and control signals as well as telemetry information, to other nodes in network 10 via the last intra-node transceiver $60_j$ and associated OADM $50_i$ as described in more detail below.

Transceiver $60_1$ includes a light source 102, for example a relatively inexpensive LED producing light in the 1.3 $\mu$m range, which is coupled to combining element 101, for example an interference filter, by way of line 103. The signal produced by light source 102 is combined with the payload channel having wavelength $\lambda_2$ at combining element 101. Once combined, the signal is supplied to OADM 50$_1$ by way of line 73 as described above. The diagnostic service signal produced by light source 102 can be, for example, a continuous wave (CW) signal in the 1.3 μm range where a photodetector in a downstream transceiver, such as transceiver 60$_2$, senses the presence or absence of the signal. In this manner, the optical path defined between transceiver 60$_1$ and OADM 50$_1$ via paths 70 and 73, as well as the optical path defined between OADM 50$_1$ and OADM 50$_2$, can be monitored by this type of diagnostic service signal.

Alternatively, light source 102 can be used to supply a modulated signal carrying information data to downstream OADMs and transceivers. The diagnostic service signal may also be generated having a low frequency tone, for example less than 100 KHz, associated with a particular payload channel light source, such as source 105. In this manner, any leakage which occurs from the service channel signal leaking into the pass-through channels in the respective OADMs can be distinguished by unique tones associated with each payload channel.

Although system 10 is schematically illustrated and described above as a transceiver-based system, OADMs 50$_1$, 50$_2$ . . . 50$_i$ may be coupled to customer equipment via a short reach interface. In this situation, optoelectronic equipment housed at a customer's site receives and processes the information carried by the payload channel having wavelength $\lambda_2$, the service channel having wavelength $\lambda_{SC}$ as well as the diagnostic service signal which provides information concerning the optical paths between the intra-node OADMs and the customer terminal equipment.

OADM 50$_2$ receives the diagnostic service signal together with the WDM channels received from OADM 50$_1$ and drops a payload channel having a particular wavelength, for example $\lambda_3$ in the 1.5 μm range by way of filtering element 115. The dropped channel having wavelength $\lambda_3$ and the diagnostic service signal are supplied to transceiver 60$_2$ via line 110. The remaining channels present in the WDM signal having, for example, wavelengths $\lambda_1, \lambda_2, \lambda_4 \ldots \lambda_i$, are passed through to optical combining element 120 via line 125.

Transceiver 60$_2$ includes an optical separator 130 which separates the payload channel having wavelength $\lambda_3$ from the diagnostic service signal. Once separated, the payload channel is supplied to a first receiving element 135, such as a photodiode, via line 131 and the diagnostic service signal is supplied to a second receiving element 140, such as a photodiode, via line 145. Receiving elements 135 and 140 generate electrical signals in response to the received optical signals. The electrical signals generated by receiving element 135 modulate, either directly or externally, light source 150. Light source 150 is used to modulate the information received via the payload channel having wavelength $\lambda_3$ to a channel having a different wavelength, usually in the 1.3 μm range, so that it can be recognized by customer receiving equipment (e.g. SONET equipment) coupled to light source 150 via line 155.

Transceiver 60$_2$ includes a receiving element 160, such as a photodiode, which receives information signals from the customer transmission equipment at a particular wavelength, usually in the 1.3 μm range, via line 165 and generates electrical signals in response thereto. These signals are used to modulate, either directly or externally, light source 170. Transceiver 60$_2$ includes a continuity tone service channel light source 180, for example a relatively inexpensive LED producing light in the 1.3 μm range, which is coupled to combining element 185 by way of line 190. Similar to light source 102 included in intra-node transceiver 60$_1$, light source 180 produces a diagnostic service signal to be detected by downstream transceivers, e.g. transceiver 60$_j$. The diagnostic service signal is combined with the payload channel having wavelength $\lambda_3$ at combining element 185. This combined signal is supplied to OADM 50$_2$ by way of line 195. These signals are added to the pass-through WDM channels $\lambda_1, \lambda_2, \lambda_4, \ldots \lambda_i$ supplied via line 125 by way of combining element 120 before being supplied to OADM 50$_i$ or intermediate OADMs within node 20$_2$ via line 32. In this manner, the optical paths defined between transceiver 60$_2$ and OADM 50$_2$ via paths 110 and 195 are monitored by the diagnostic service signal.

The last OADM 50$_i$ within node 20$_2$ receives the WDM and the simplified service channel signal from the preceding OADM, e.g. OADM 50$_2$. A filtering element 200 included in OADM 50$_i$ separates the diagnostic service signal and a payload channel having a particular wavelength, for example $\lambda_i$, from the remaining WDM channels having wavelengths $\lambda_1, \lambda_3 \ldots \lambda_{i-1}$. The remaining channels are supplied to combining element 220 via line 225.

Transceiver 60$_j$ is coupled to OADM 50$_i$ by way of lines 226 and 227. Transceiver 60$_j$ includes an optical separator 230 which separates the payload channel having wavelength $\lambda_i$ from the diagnostic service signal received from transceiver 60$_2$. Once separated, the payload channel is supplied to a first receiving element 235, such as a photodiode, via line 231. The diagnostic service signal is supplied to a second receiving element 240, such as a photodiode, via line 245. Receiving elements 235 and 240 generate electrical signals in response to the received signals. The electrical signals generated by receiving element 235 modulate, either directly or externally, a light source 250. Light source 250 is used to modulate the information received via the payload channel having wavelength $\lambda_i$ to a channel having a different wavelength, usually in the 1.3 μm range, so that it can be recognized by customer receiving equipment (e.g. SONET equipment) coupled to light source 250 via line 255.

Transceiver 60$_j$ includes a receiving element 260, such as a photodiode, which receives information signals from customer transmission equipment at a particular wavelength, usually in the 1.3 μm range, via line 265 and generates electrical signals in response thereto. These signals are used to modulate, either directly or externally, light source 270.

Combining element 100 receives the service channel signal from light source 92 of the service channel modem 90 by way of line 93 and combines it with the payload channel having wavelength $\lambda_i$ received from light source 270. The combined payload signal having wavelength $\lambda_i$ and the service channel having wavelength $\lambda_{SC}$ are supplied to OADM 50$_i$ by way of line 227. These signals are added to the pass-through WDM channels $\lambda_1, \lambda_2 \ldots \lambda_{i-1}$ supplied via line 225 by way of combining element 220 before being supplied to the next node within network 10 via optical path 30$_2$.

Accordingly, the service channel signal is received by the first OADM and its associated transceiver within a node and supplied to the last transceiver and its associated OADM within the same node. A diagnostic service signal is used to traverse intra-node paths between transceivers and OADMs. In this manner, a service channel is provided which monitors intra-node optical paths.

Figure 3:
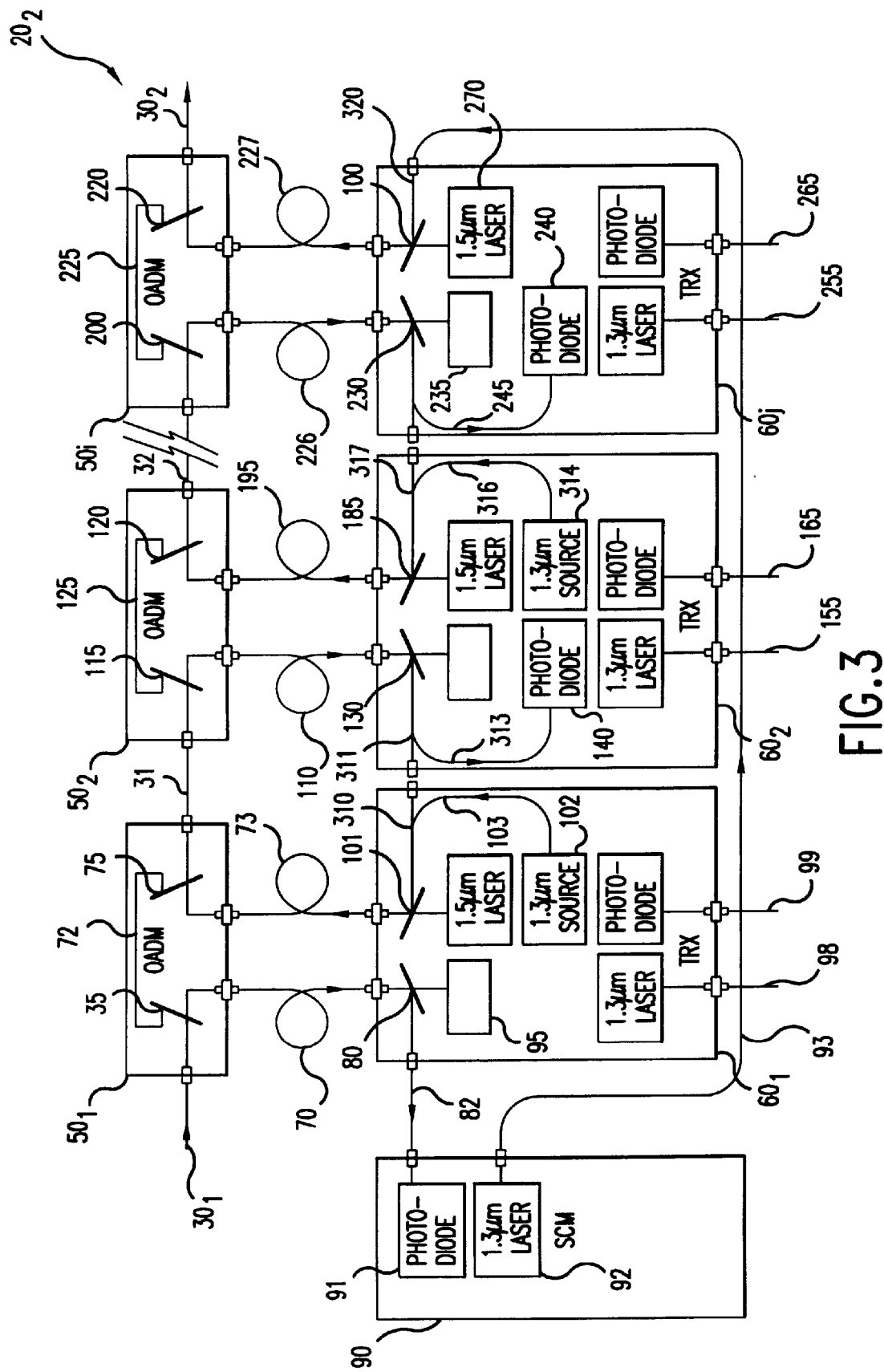
FIG. 3 illustrates a schematic block diagram of a network node including the use of a diagnostic service signal in accordance with an alternative embodiment of the present invention.

FIG. 3 schematically illustrates an alternative embodiment of an exemplary node 20$_2$ and the associated intra-node service channel configuration in accordance with the present invention. As described above, OADM $50_1$ receives a WDM signal including a plurality of optical channels having wavelengths $\lambda_1 \ldots \lambda_i$ as well as a service channel having wavelength $\lambda_{SC}$ via optical path $30_1$. OADM $50_1$ is configured to drop the service channel having wavelength $\lambda_{SC}$ and a payload channel having a particular wavelength, for example $\lambda_2$, and supplies the channels to transceiver $60_1$ via line 70. The remaining WDM channels are supplied to combining element 75 via line 72.

An optical separator 80 included in transceiver $60_1$ separates the service channel having wavelength $\lambda_{SC}$ from the payload channel. The service channel is supplied to service channel modem 90 and to combining element 100 of transceiver $60_j$ as described with reference to FIG. 2. Light source 102 produces light, for example, in the 1.3 μm range and is coupled to combining element 101 by way of line 103 and splitter 310. Light source 102 supplies a diagnostic service signal to the next transceiver $60_2$ by way of OADM $50_2$.

Transceiver $60_2$ includes a splitter 311 which taps a portion of the simplified service channel signal received from transceiver $60_1$ via OADMs $50_1$ and $50_2$. The diagnostic service signal is received by photodiode 140 via line 145. Transceiver $60_2$ includes a light source 180 coupled to combining element 185 by way of line 190 and splitter 317. Light source 102 supplies the diagnostic service signal to the next transceiver, for example transceiver $60_j$, by way of OADMs $50_1$ and $50_2$.

Transceiver $60_j$ includes an optical separator 230 which separates the payload channel having, for example, wavelength $\lambda_i$ from the diagnostic service signal received from transceiver $60_2$. Once separated, the payload channel is supplied to a first receiving element 235, such as a photodiode, via line 231 and splitter 314. The diagnostic service signal is supplied to a second receiving element 240, such as a photodiode, via line 245. Elements 235 and 240 generate electrical signals in response to the received signals.

Figure 4:
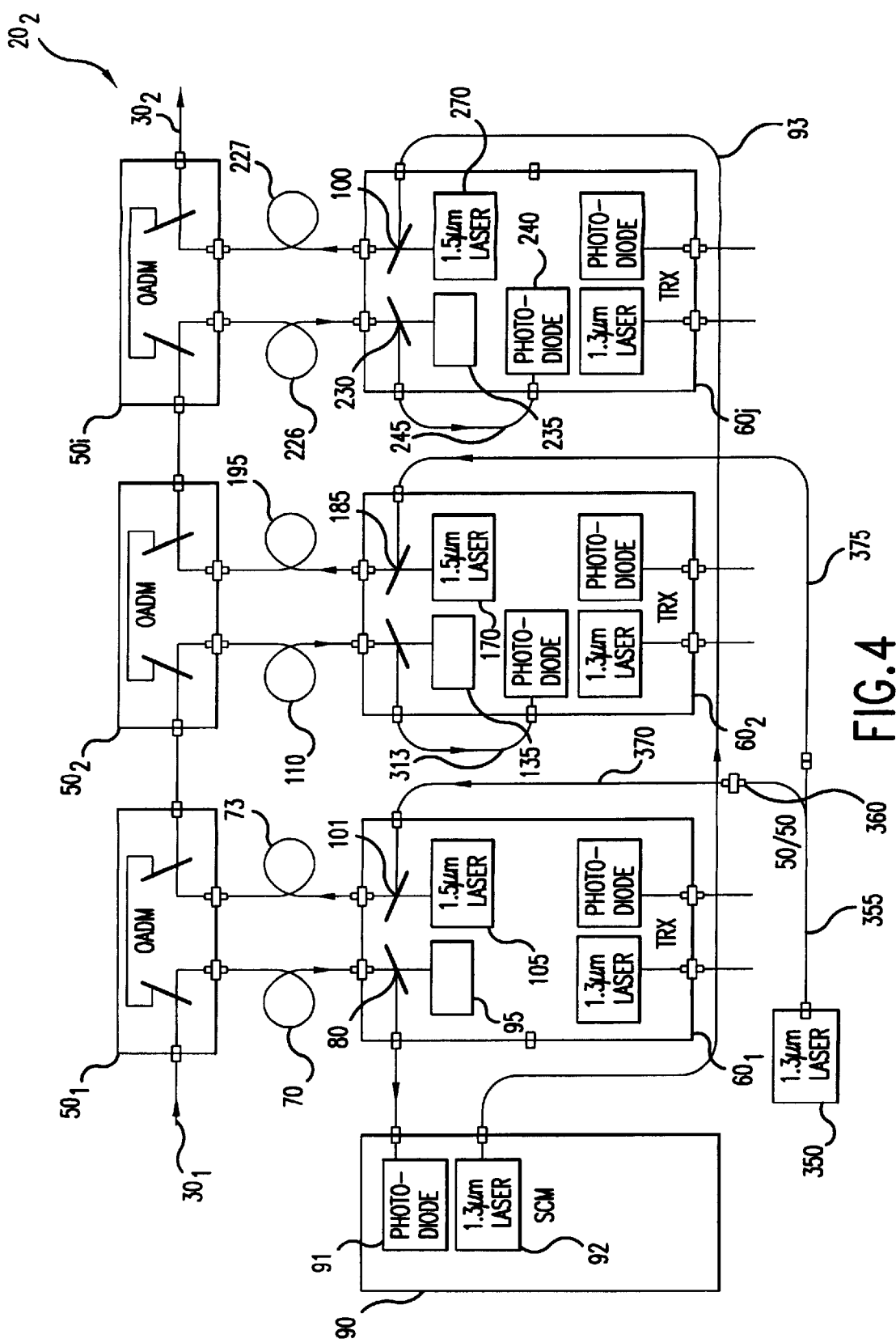
FIG. 4 illustrates a schematic block diagram of a network node including the use of a diagnostic service signal in accordance an alternative embodiment of the present invention.
Figure 5:
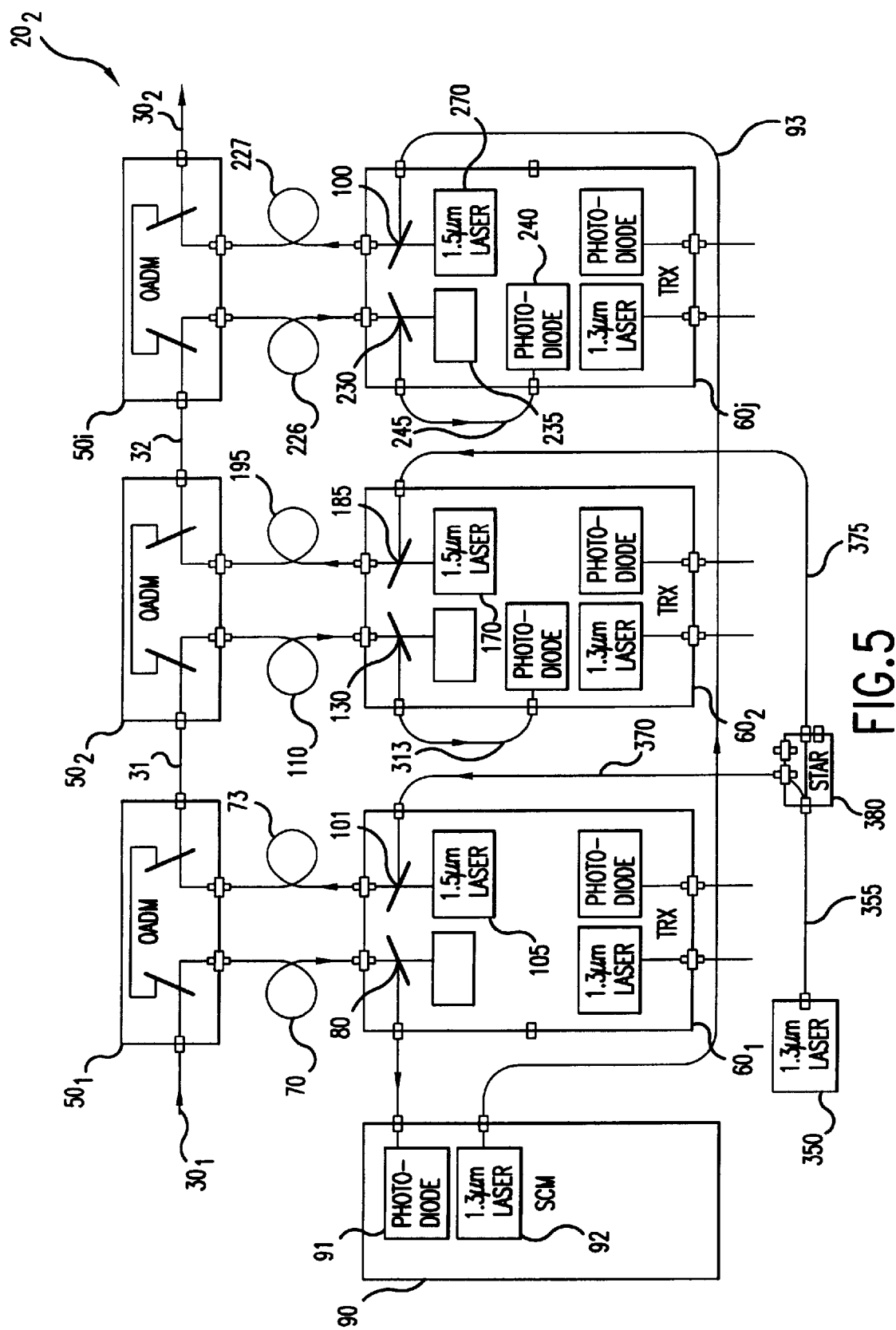
FIG. 5 illustrates a schematic block diagram of a network node including the use of a diagnostic service signal in accordance with an alternative embodiment of the present invention.
Figure 6:
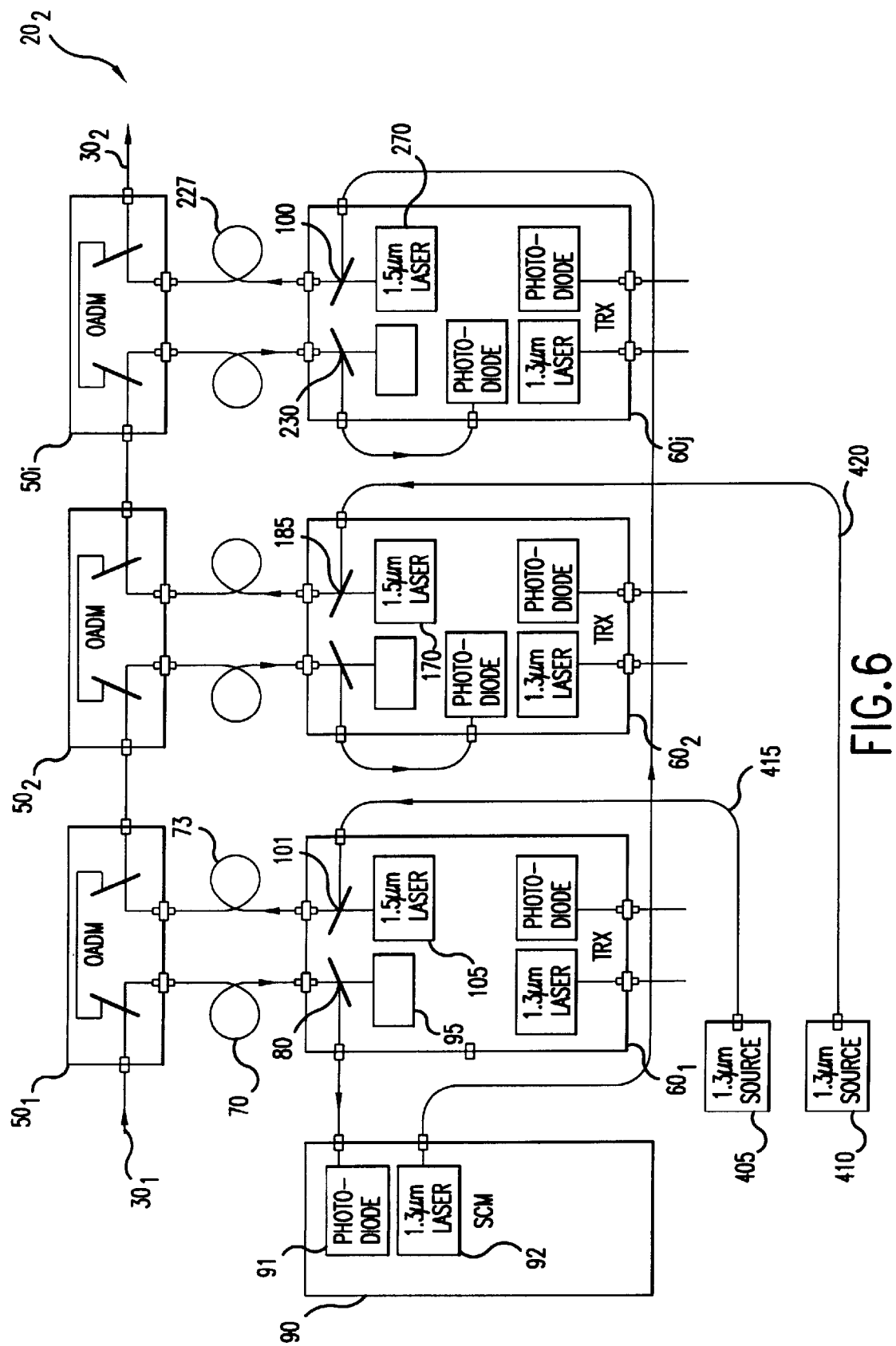
FIG. 6 illustrates a schematic block diagram of a network node including the use of a diagnostic service signal in accordance with an alternative embodiment of the present invention.

FIGS. 4–6 illustrate multiple alternative sources of the intra-node continuity tone service channel. Turning first to FIG. 4, OADM $50_1$ is configured to drop the service channel having wavelength $\lambda_{SC}$ and a payload channel having a particular wavelength, for example $\lambda_2$, and supplies the signals to transceiver $60_1$ via line 70. The remaining WDM channels pass through to combining element 75 via line 72. The service channel is supplied to service channel modem 90 and to combining element 100. Light source 92 supplies the service channel to the last receiver within node $20_2$, for example $60_j$ by way of line 93 as described above. A light source 350, for example a 1.3 μm laser, provides an intra-node diagnostic service signal to splitter 360 via line 355. A portion of this signal is tapped and supplied to combining element 101 via line 370 where it is combined with a payload channel supplied by light source 105. A second portion of the diagnostic service signal is supplied to combining element 185 via line 375 where it is combined with a payload channel supplied by light source 170 of transceiver $60_2$.

Transceiver $60_j$ includes an optical separator 230 which separates the payload channel having, for example, wavelength $\lambda_i$ from the diagnostic service signal received from transceiver $60_2$. Once separated, the payload channel is supplied to a first receiving element 235, such as a photodiode, via line 231. The diagnostic service signal is supplied to a second receiving element 240, such as a photodiode, via line 245. Receiving elements 235 and 240 generate electrical signals in response to the received signals.

In this embodiment, a single light source 350 together with an optical splitter 360 supplies a diagnostic service signal to transceivers $60_1$ and $60_2$ to monitor intra-node optical paths defined between transceivers $60_1 \ldots 60_i$ and OADMs $50_1 \ldots 50_i$.

FIG. 5 schematically illustrates an alternative embodiment where light source 350, as described with reference to FIG. 4, provides a diagnostic service signal to star coupler 380 via line 355. A portion of the diagnostic service signal is supplied to combining element 101 via line 370 where it is combined with a payload channel supplied by light source 105. A second portion of the diagnostic service signal is supplied to combining element 185 via line 375 where it is combined with a payload channel supplied by light source 170.

FIG. 6 schematically illustrates two light sources 405 and 410 each supplying a diagnostic service signal to transceivers $60_1$ and $60_2$, respectively. Light source 405 supplies the diagnostic service signal to transceiver $60_1$ by way of line 415. Combining element 101 combines this diagnostic service signal with the payload channel supplied via light source 105. Light source 410 supplies the diagnostic service signal to transceiver $60_2$ by way of line 420. Combining element 185 combines this signal with the payload channel supplied via light source 170.

Figure 7:
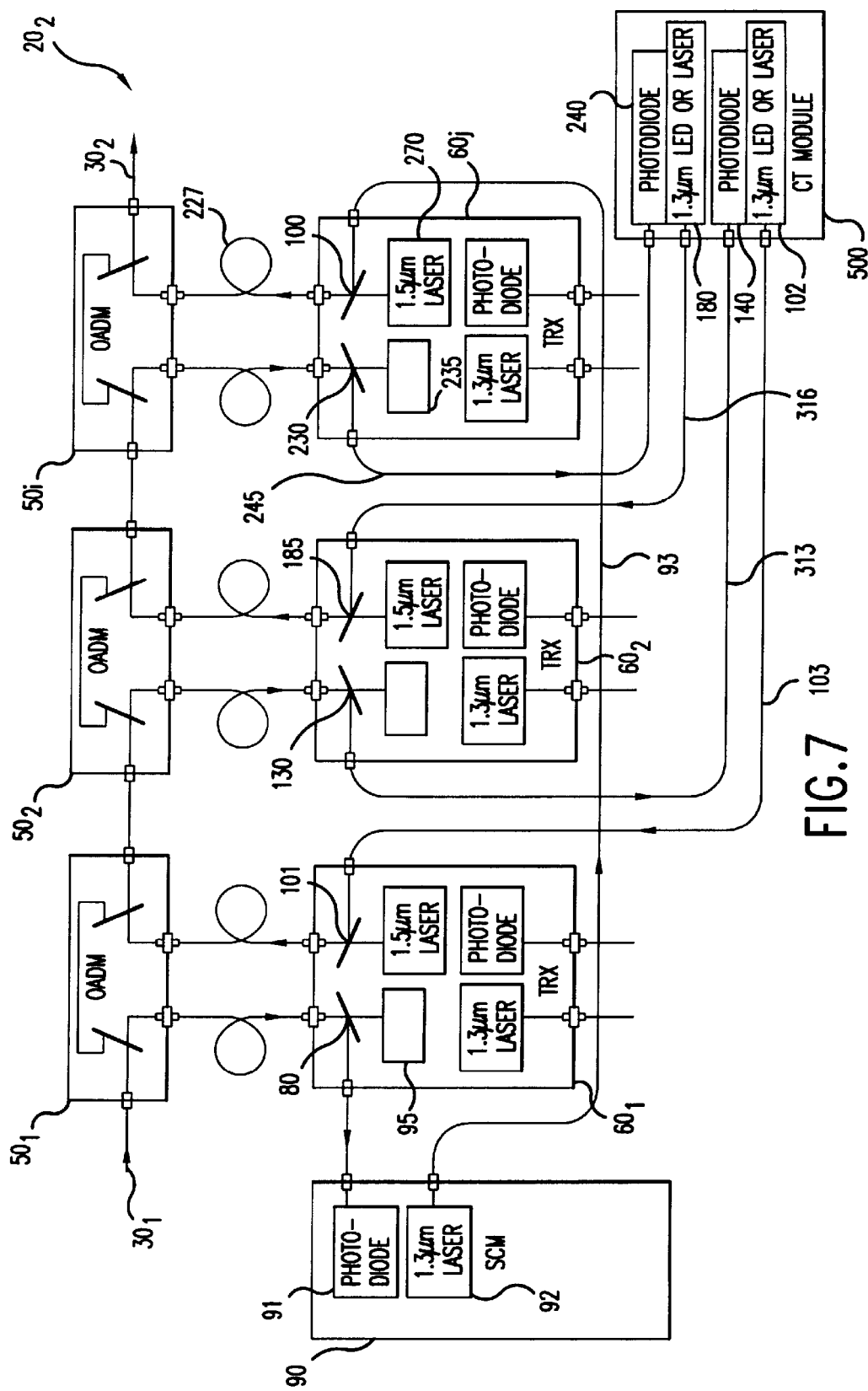
FIG. 7 illustrates a schematic block diagram of a network node including the use of a diagnostic service signal in accordance with an alternative embodiment of the present invention.

FIG. 7 schematically illustrates an alternative embodiment where light source 102 associated with transceiver $60_1$, photodiode 140 and light source 180 associated with transceiver $60_2$, and photodiode 240 associated with transceiver $60_j$ are remotely located in module 500. This may be desirable, for example, to save board space in each of the transceivers. In particular, light source 102, such as a 1.3 μm LED or laser, is located in module 500 and supplies a diagnostic service signal to combining element 101 of transceiver $60_1$ via line 103. Photodiode 140 is located in module 500 and receives the diagnostic service signal from optical separator 130 of transceiver $60_2$ via line 313. Likewise, light source 180, such as a 1.3 μm LED or laser, is located in module 500 and supplies a diagnostic service signal to combining element 185 of transceiver $60_2$ via line 316. Photodiode 240 is also located in module 500 and receives the diagnostic service signal from optical separator 230 of transceiver $60_j$ via line 245. As described above, light source 92 supplies the service channel having wavelength $\lambda_{SC}$ to the last transceiver within node $20_2$, for example $60_j$, by way of line 93. Combining element 100 combines the service channel and the payload channel from source 270 and supplies them to OADM $50_i$ via line 227.

Figure 8:
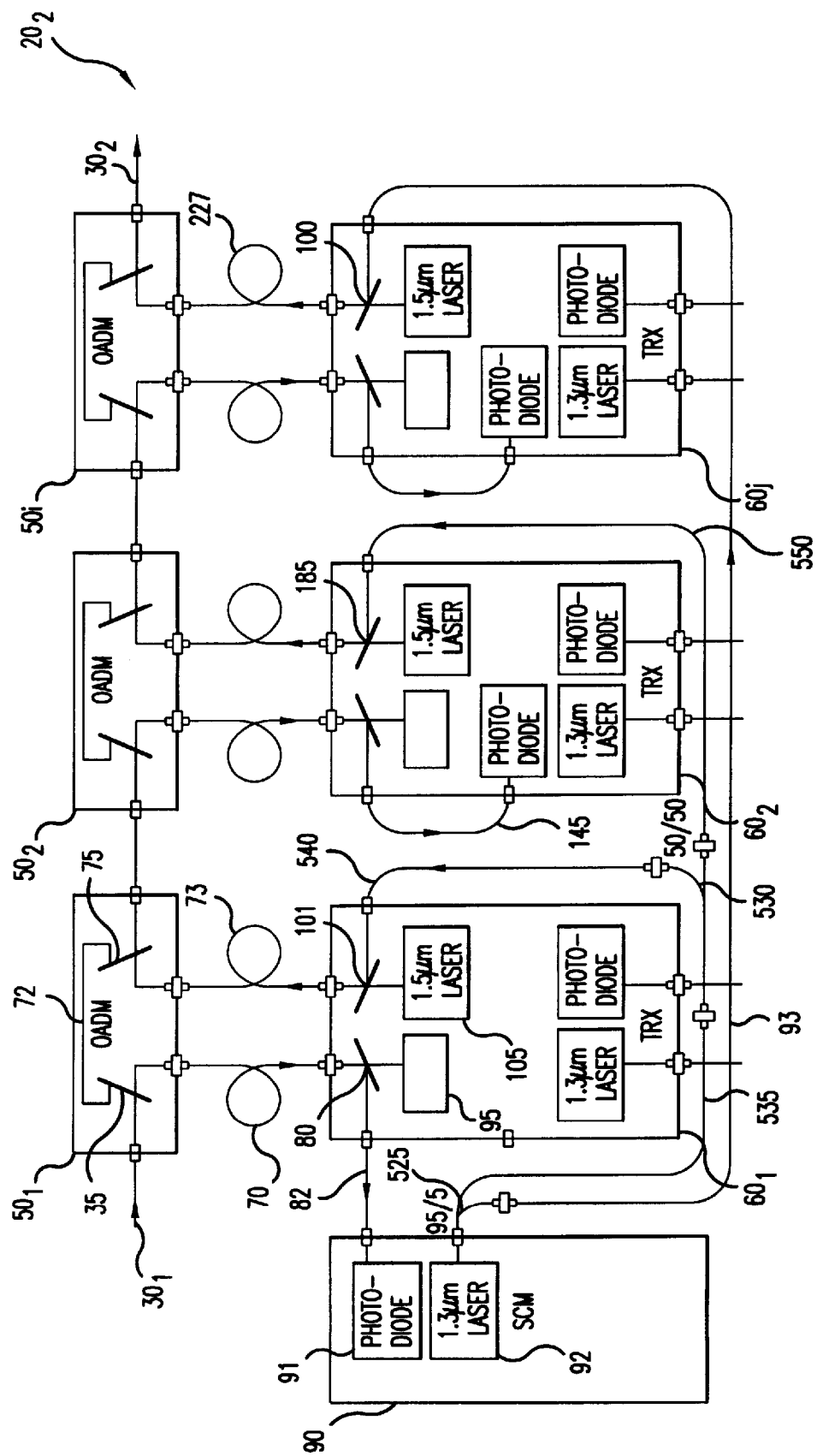
FIG. 8 illustrates a schematic block diagram of a network node including the use of a diagnostic service signal in accordance with an alternative embodiment of the present invention.

FIGS. 8–11 schematically illustrate various configurations utilizing particular sources for the diagnostic service signal. Turning first to FIG. 8 and as described above, OADM $50_1$ receives a WDM signal including a plurality of optical channels having wavelengths $\lambda_1 \ldots \lambda_i$ as well as a service channel having wavelength $\lambda_{SC}$ via optical path $30_1$. OADM $50_1$ includes a filtering element 35 configured to drop the service channel having wavelength $\lambda_{SC}$ and a payload channel having a particular wavelength, for example $\lambda_2$. These signals are supplied to transceiver $60_1$ via line 70. The remaining WDM channels pass through to combining element 75 via line 72.

The service channel and the dropped payload channel are separated by way of optical separator 80 and supplied to service channel modem 90 by way of line 82. Photodiode 91 receives the service channel and generates electrical signals in response thereto. Light source 92 supplies the service channel having wavelength $\lambda_{SC}$ to splitter 525 where the majority of the service channel, for example 95%, is carried via line 93 to the last transceiver 60$_j$ within node 20$_2$. A smaller percentage, such 5%, of the service channel is supplied to splitter 530 via line 535. The service channel signal is split by optical splitter 530, such as a 50/50 splitter. A first portion of this split signal is supplied to combining element 101 associated with transceiver 60$_1$ via line 540. A second portion of the service channel signal is supplied to combining element 185 associated with transceiver 60$_2$ via line 550.

Figure 9:
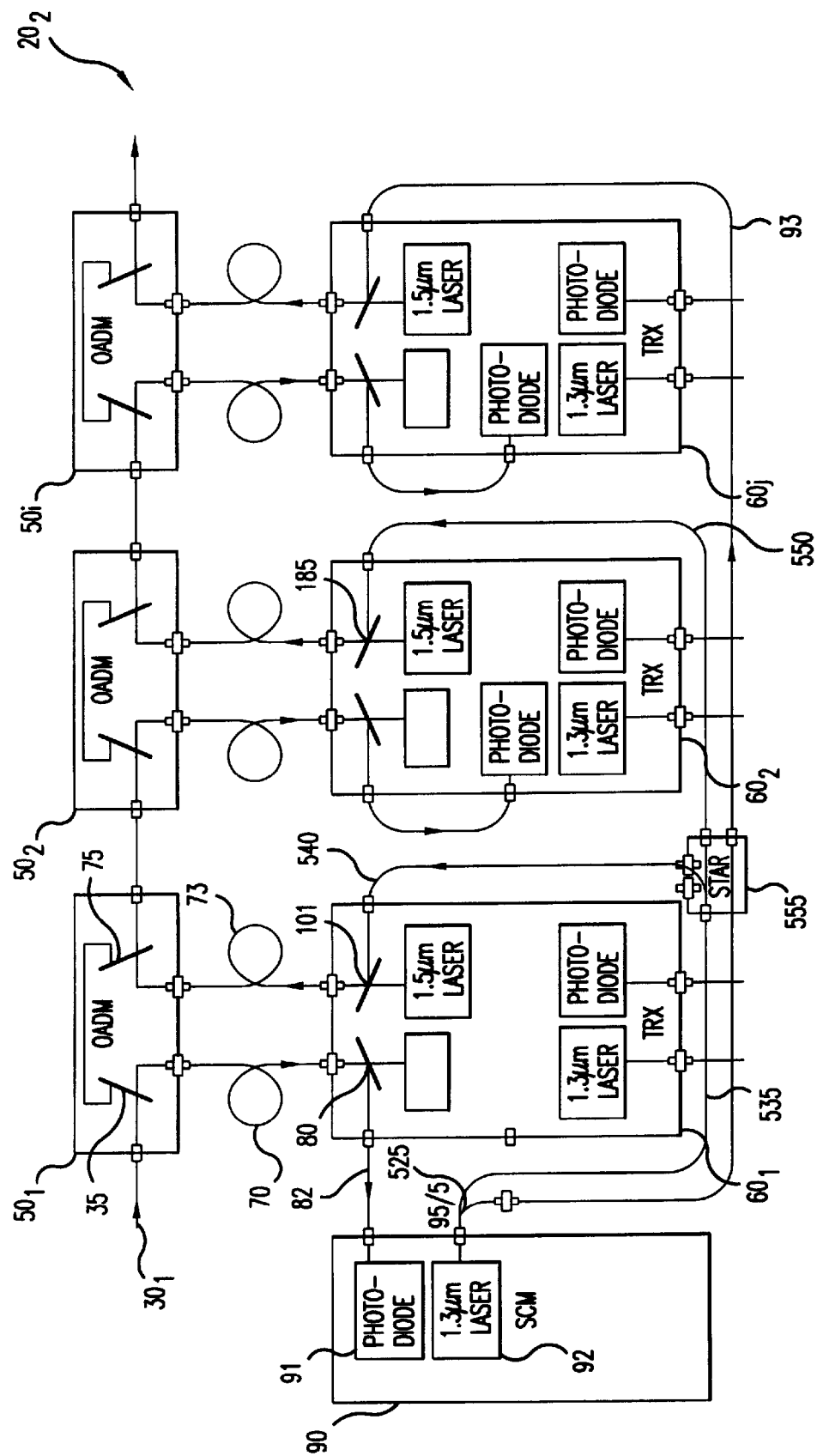
FIG. 9 illustrates a schematic block diagram of a network node including a diagnostic service signal in accordance with an alternative embodiment of the present invention.

FIG. 9 schematically illustrates light source 92 which supplies the diagnostic service signal service channel having wavelength $\lambda_{SC}$ to splitter 525 where the majority of the service channel, for example 95%, is carried via line 93 to the last transceiver 60$_j$ within node 20$_2$. A smaller percentage, such 5%, of the service channel is supplied to star coupler 555 via line 535. A portion of this signal is supplied to combining element 101 associated with transceiver 60$_1$ via line 540. A second portion of the service channel signal is supplied to combining element 185 associated with transceiver 60$_2$ via line 550. In this manner, a portion of the service channel signal having wavelength $\lambda_{SC}$ is used to monitor intra-node optical paths between transceivers and OADMs.

Figure 10:
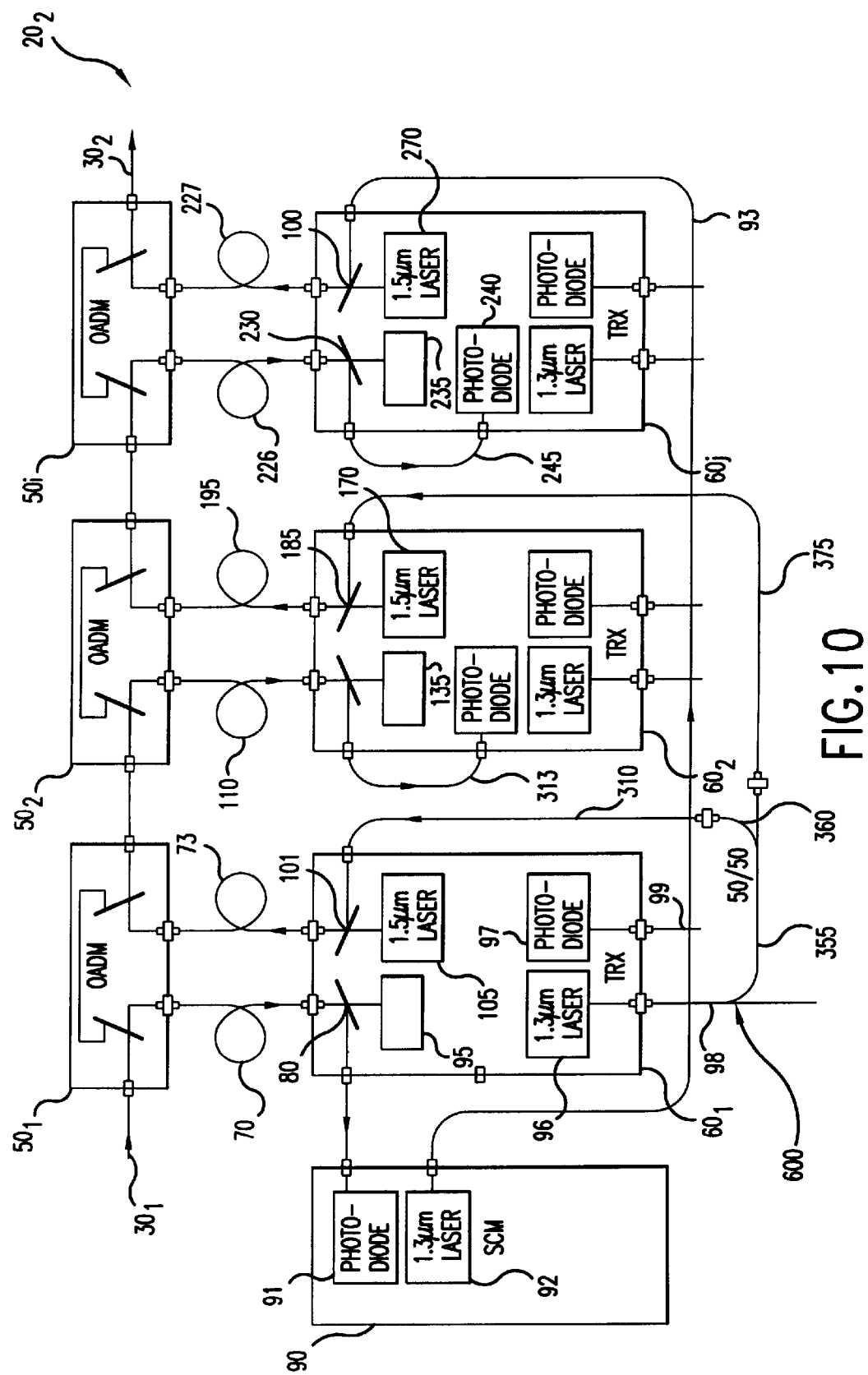

FIG. 10 schematically illustrates the use of light source 96 as the source for the diagnostic service signal. Light source 96, as described earlier, is included in transceiver 60$_1$ and is used to transmit information received via the payload channel having a particular wavelength, for example $\lambda_2$, to a channel having a different wavelength, usually in the 1.3 $\mu$m range, so that it can be recognized by customer receiving equipment (e.g. SONET equipment) coupled to transceiver 60$_1$ via line 98. A splitter 600 is coupled along line 98 where the majority of the signal generated by light source 96, for example 95%, is carried via line 98 to customer receiving equipment. A smaller percentage, such as 5%, of the light signal generated by light source 96 is supplied to splitter 360, such as a 50/50 splitter, along line 355. A portion of this signal is supplied to combining element 101 associated with transceiver 60$_1$ via line 370. Alternatively, splitter 360 can be a star coupler similar to the star coupler 380 disclosed with reference to FIG. 5. A second portion of the service channel signal is supplied to combining element 185 associated with transceiver 60$_2$ via line 375. In this manner, a portion of the 1.3 $\mu$m source 96 is used to monitor intra-node optical paths between transceivers and OADMs without compromising the integrity of the signals transmitted to customer receiving equipment along line.

Figure 11:
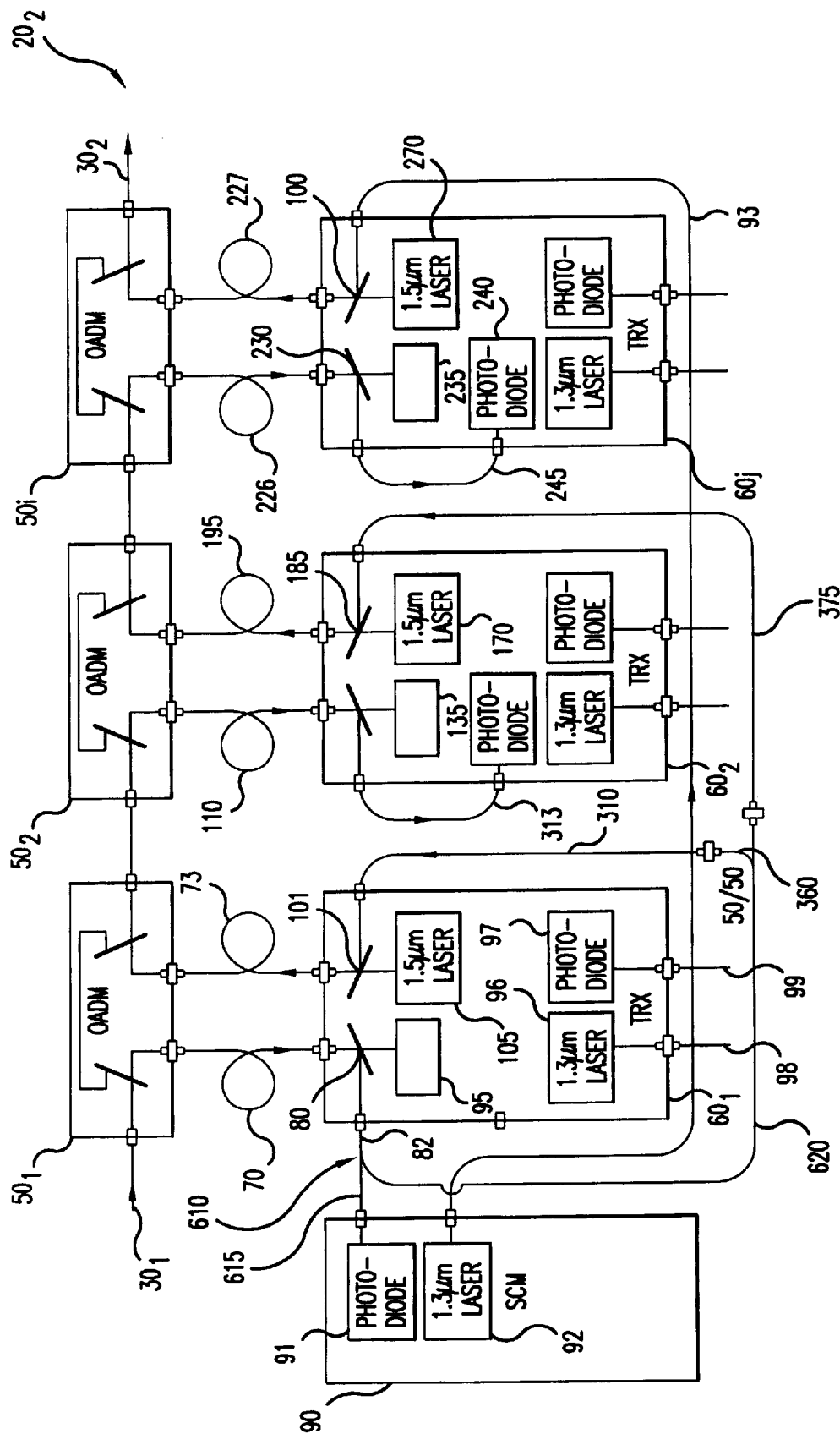

FIG. 11 schematically illustrates the use of a portion of the service channel signal having wavelength $\lambda_{SC}$ received from optical separator 80 as the diagnostic service signal. As described above, a service channel having wavelength $\lambda_{SC}$ and a payload channel having a particular wavelength, for example $\lambda_2$ are separated by optical separator 80 included in transceiver 60$_1$. The service channel having wavelength $\lambda_{SC}$ is supplied to service channel modem 90 by way of line 82. The payload channel having a particular wavelength is supplied to receiving element 95 as described above. A splitter 610, coupled along line 82, taps a portion, for example 5%, of the service channel signal having wavelength $\lambda_{SC}$, and supplies it to splitter 360, such as a 50/50 splitter, by way of line 620. A portion of this signal is supplied to combining element 101 associated with transceiver 60$_1$ via line 370. Alternatively, splitters 610 and 360 can be star couplers. A second portion of the service channel signal is supplied to combining element 185 associated with transceiver 60$_2$ via line 375. In this manner, a portion of the service channel signal having wavelength $\lambda_{SC}$ supplied to service channel modem is used to monitor intra-node optical paths between transceivers and OADMs.

While the foregoing invention has been described in terms of the embodiments discussed above, numerous variations are possible. Accordingly, modifications and changes such as those suggested above, but not limited thereto, are considered to be within the scope of the present invention.

What is claimed is:

1. A method for monitoring a plurality of components associated with a communications network carrying an optical signal at a first wavelength, said optical signal having associated payload information, said method comprising the steps of:

generating a first service optical signal at a first nodal component within a first node of said communications network, said first service optical signal having a second wavelength different than said first wavelength;

transmitting said first service optical signal along a first optical path to a second nodal component within said first node;

detecting the presence or absence of said first service optical signal at said second nodal component; and generating a second service optical signal within said first node and transmitting said second service optical signal to a second node of said communications network.

2. The method in accordance with claim 1 further comprising the step of prior to transmitting, combining said first service optical signal with said optical signal at said first wavelength.

3. The method in accordance with claim 2 further comprising the step of modulating a unique tone on said first service optical signal, said tone associated with a transmitter supplying said optical signal at said first wavelength.

4. The method in accordance with claim 3 wherein said unique tone has an associated frequency less than approximately 100 KHz.

5. The method in accordance with claim 2 further comprising the step of, prior to detecting, extracting at said second nodal component said first service optical signal from said combined signal.

6. The method of claim 1 wherein said method for monitoring further comprising the steps of:

generating a third service optical signal at said second nodal component;

transmitting said third service optical signal to a third nodal component along a second optical path;

detecting the presence or absence of said third service optical signal at said second nodal component.

7. The method in accordance with claim 6 wherein said optical signal at said first wavelength is a first optical signal, said method for monitoring further comprising the step of, prior to transmitting, combining said third service optical signal with a second optical signal having associated second payload information at a third wavelength.

8. The method in accordance with claim 6 wherein said step of generating said third service optical signal comprises originating said third service optical signal as a continuous wave.

9. The method in accordance with claim 6 further comprising the step of modulating information on said third service optical signal.

10. The method in accordance with claim 1 wherein said step of generating said first service optical signal comprises originating said first service optical signal as a continuous wave signal.

11. The method in accordance with claim 1 further comprising the step of modulating information on said first service optical signal.

12. A service channel monitoring apparatus for use within a communications network having first and second nodes, said first node comprising:

first and second nodal components;

an optical path disposed between said first and second nodal components, said optical path carrying a first service signal transmitted from said first nodal component along said optical path to said second nodal component;

a receiving element coupled to said optical path, said receiving element detecting said first service signal at said second nodal component; and a service channel transmitter being configured to transmit a second service signal to said second node.

13. The apparatus in accordance with claim 12 further comprising a combining element for combining said first service signal with an information carrying optical channel having a particular wavelength, said information carrying channel being associated with a wavelength division multiplexed optical signal.

14. The apparatus in accordance with claim 13 wherein said first service signal includes a modulated tone associated with said information carrying optical channel having a particular wavelength.

15. The apparatus in accordance with claim 13 further comprising a filtering element separating said first service signal from said information carrying channel, said filtering element coupled along said optical path.

16. The apparatus in accordance with claim 15 wherein said filtering element is an optical interference filter.

17. The apparatus in accordance with claim 13 wherein said combining element is an optical interference filter.

18. The apparatus in accordance with claim 12 wherein said first service signal includes a modulated tone.

19. The apparatus in accordance with claim 12 wherein said first service signal includes a modulated information signal.

20. The apparatus in accordance with claim 12 wherein said first nodal component is at least one component selected from the group consisting essentially of an optical add/drop multiplexer, transceiver, receiver, transmitter, coupler and filter.

21. A communication system comprising:

a first add/drop multiplexer coupled to an optical path, said optical path carrying a plurality of information bearing optical channels and a first service signal, each of said channels having a respective wavelength, said add/drop multiplexer selecting a first one of said plurality of information bearing optical channels and said first service signal;

a second add/drop multiplexer coupled to said optical path;

a light source coupled to said first add/drop multiplexer, said light source supplying a second service signal to said second add/drop multiplexer, said second add/drop multiplexer selecting said second service signal and a second one of said plurality of said information bearing optical channels;

a receiving element coupled to said second add/drop multiplexer, said receiving element receiving said second service signal.

22. The system in accordance with claim 21 wherein said second service signal includes a modulated tone.

23. The system in accordance with claim 21 wherein said second service signal includes a modulated tone associated with said first one of said plurality of said information bearing optical channels.

24. The system in accordance with claim 21 wherein said second service signal carries modulated information.

25. The system in accordance with claim 21 wherein said second service signal is a continuous wave.

26. The system in accordance with claim 21 wherein said light source is a first light source, said communication system further comprising:

a third add/drop multiplexer coupled to said second add/drop multiplexer along said optical path;

a second light source supplying a third service signal to said third add/drop multiplexer, said third add/drop multiplexer selecting said third service signal and a third one of said plurality of said information bearing optical channels.

27. The system in accordance with claim 26 wherein said receiving element is a first receiving element, said communication system further comprising a second receiving element coupled to said third add/drop multiplexer, said receiving element receiving said third service signal.

28. The system in accordance with claim 26 wherein said third service signal includes a modulated tone.

29. The system in accordance with claim 26 wherein said third service signal includes a modulated tone associated with said second of said plurality of said information bearing optical channels.

30. The system in accordance with claim 26 wherein said third service signal carries modulated information.

31. The system in accordance with claim 26 wherein said third service signal is a continuous wave.

32. The system in accordance with claim 21 wherein said light source generates light having a wavelength in the 1.3 $\mu$m range.

33. The system in accordance with claim 21 further comprising an additional light source generating said first service signal said first service signal having a wavelength different than that associated with said plurality of information bearing optical signals.

34. The system in accordance with claim 21 further comprising an additional light source which is configured to generate optical signals intended for customer receiving equipment.

35. The system in accordance with claim 34 wherein said additional light source generates light having a wavelength in the 1.3 $\mu$m range.

* * * * *